United States Patent
Johannison et al.

(10) Patent No.: US 12,502,316 B2
(45) Date of Patent: Dec. 23, 2025

(54) DRESSING COMPRISING A FIRST AND A SECOND RELEASE LAYER

(71) Applicant: Mölnlycke Health Care AB, Gothenburg (SE)

(72) Inventors: Ulf Johannison, Landvetter (SE);
Tommy Sundebäck, Trollhättan (SE);
David Valham, Västra Frölunda (SE);
Tina Westerberg, Gothenburg (SE);
Lena Jacobsson, Sävedalen (SE)

(73) Assignee: Mölnlycke Health Care AB, Mölndal (SE)

( * ) Notice: Subject to any disclaimer, the term of this patent is extended or adjusted under 35 U.S.C. 154(b) by 372 days.

(21) Appl. No.: 18/001,736

(22) PCT Filed: Jun. 29, 2021

(86) PCT No.: PCT/EP2021/067826
§ 371 (c)(1),
(2) Date: Dec. 14, 2022

(87) PCT Pub. No.: WO2022/002924
PCT Pub. Date: Jan. 6, 2022

(65) Prior Publication Data
US 2023/0225906 A1    Jul. 20, 2023

(30) Foreign Application Priority Data
Jul. 2, 2020 (EP) .................................... 20183679

(51) Int. Cl.
*A61F 13/02*    (2024.01)
*A61F 13/00*    (2024.01)

(52) U.S. Cl.
CPC ...... *A61F 13/0266* (2013.01); *A61F 13/0289* (2013.01); *A61F 2013/00817* (2013.01)

(58) Field of Classification Search
CPC .. A61F 13/00; A61F 13/0266; A61F 13/0289; A61F 13/0203; A61F 13/0259;
(Continued)

(56) References Cited

U.S. PATENT DOCUMENTS 4,614,183 A    9/1986  McCracken et al.
5,476,443 A  * 12/1995  Cartmell ............... A61F 13/023
                                                          602/57
(Continued)

FOREIGN PATENT DOCUMENTS

| CN | 108056856 | | 5/2018 | |
| CN | 108056856 A | * | 5/2018 | ........... A61N 5/0625 |
| EP | 3373874 B1 | | 9/2018 | |
| JP | 61111419 | | 7/1986 | |
| JP | 2011156186 | | 8/2011 | |

(Continued)

OTHER PUBLICATIONS

CN 108056856 A machine translation (Year: 2018).*
(Continued)

*Primary Examiner* — Caitlin A Carreiro
(74) *Attorney, Agent, or Firm* — Ballard Spahr LLP

(57) ABSTRACT

A dressing includes a backing layer, an adhesive skin contact layer, and a first release liner. The adhesive skin contact layer has a central portion and an edge portion surrounding the central portion. The first release liner is configured to be releasably attached to at least the central portion of the adhesive skin contact layer. The dressing further includes a second release liner arranged between the first release liner and at least part of the edge portion of the adhesive skin contact layer.

19 Claims, 9 Drawing Sheets

(58) Field of Classification Search
CPC .................. A61F 13/0246; A61F 13/60; A61F 2013/00817; A61F 2013/00089
USPC .................... 602/41–43, 47, 54, 56, 57, 900
See application file for complete search history.

(56) References Cited

U.S. PATENT DOCUMENTS

| | | | |
|---|---|---|---|
| 5,998,694 A * | 12/1999 | Jensen | A61F 13/023 602/56 |
| 7,585,554 B2 * | 9/2009 | Johnson | B32B 7/04 602/41 |
| 2009/0105670 A1 | 4/2009 | Bentley et al. | |
| 2014/0288477 A1 * | 9/2014 | Shulman | A61F 17/00 602/54 |

FOREIGN PATENT DOCUMENTS

| | | | | |
|---|---|---|---|---|
| JP | 5527885 B2 * | 6/2014 | | |
| JP | 2019129950 | 8/2019 | | |
| WO | WO 2011/067626 | 6/2011 | | |
| WO | WO-2011067626 A1 * | 6/2011 | ......... | A61F 13/0259 |

OTHER PUBLICATIONS

JP 5527885 machine translation (Year: 2010).*
International Search Report and Written Opinion were mailed on Oct. 26, 2021 by the International Searching Authority for International Application No. PCT/EP2021/067826 filed on Jun. 29, 2021 and published as WO2022002924 (Applicant—Molnlycke Health Care AB) (8 pages).

* cited by examiner

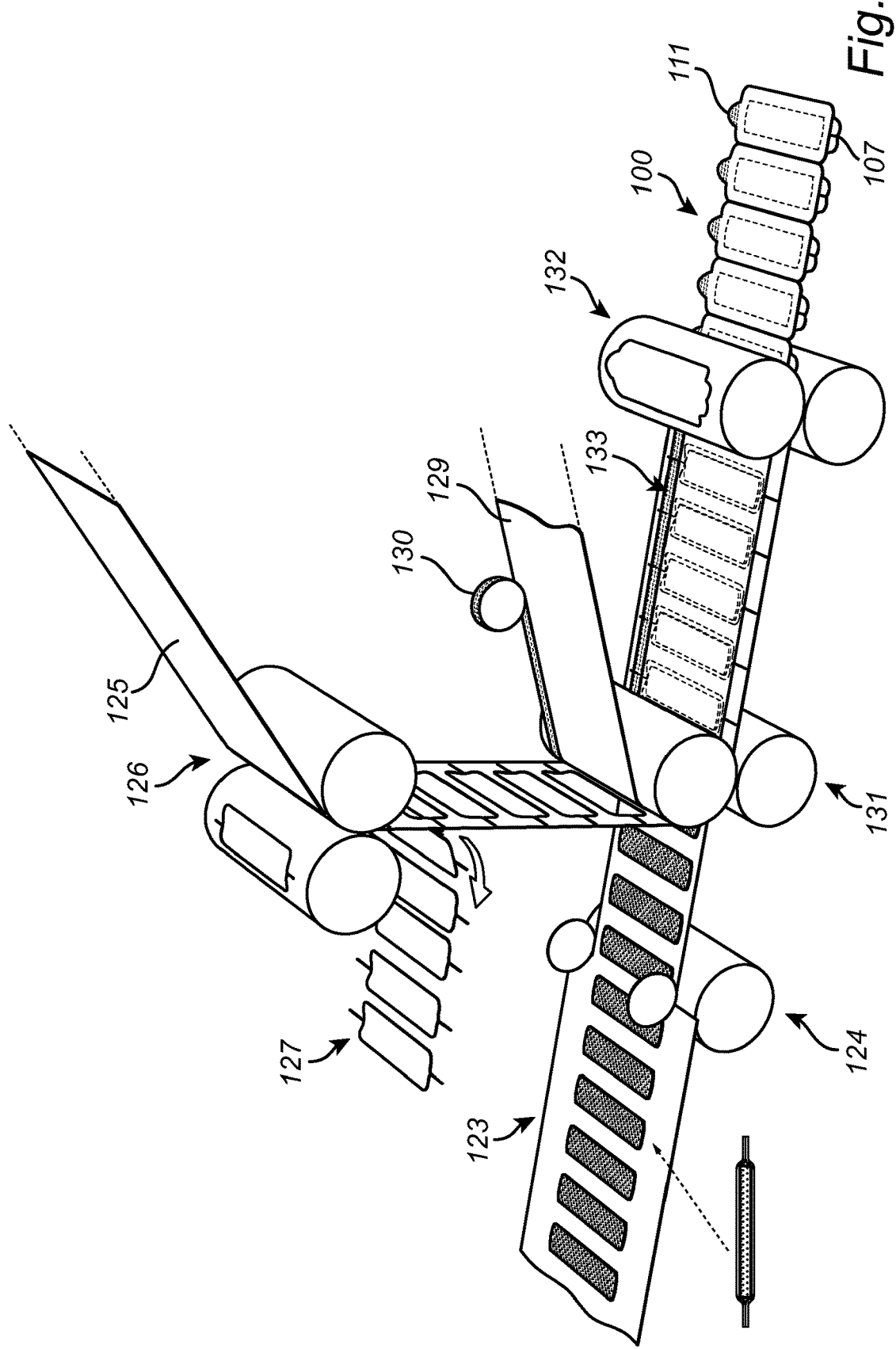

DRESSING COMPRISING A FIRST AND A SECOND RELEASE LAYER

CROSS-REFERENCE TO RELATED APPLICATIONS

This application is a U.S. National Phase Application of International Application No. PCT/EP2021/067826, filed Jun. 29, 2021, which claims priority to European Application No. 20183679.8, filed Jul. 2, 2020, each of which are hereby incorporated by reference in their entirety.

TECHNICAL FIELD

The present disclosure generally relates to a dressing comprising a first and a second release liner and to a method for manufacturing such a dressing.

BACKGROUND

Adhesive dressings are frequently used in wound care, both for the purpose of treating wounds and scars and for the purpose of preventing wounds from occurring in the first place.

Various types of dressings exist on the market. Some dressings, commonly referred to as "film dressings", typically comprise a backing layer and an adhesive skin contact layer. So called "bordered dressings" are also frequently used, and these dressings comprise an absorbent pad arranged between the backing layer and the adhesive skin contact layer. In a bordered dressing, the backing layer and the adhesive skin contact layer are configured to extend beyond the periphery of the absorbent pad.

The purpose of the adhesive skin contact layer is to adhere to the skin or the wound of a wearer and to fixate the dressing in a desirable position. A desired property of the adhesive skin contact layer when used in a dressing, regardless of being of the film or border type of dressing, is that it should be thin and pliable in order to conform to the contour of the skin.

While thinness and adhesiveness of film dressings and (at least) the border portion of a bordered dressing is desirable, these attributes typically render the dressings difficult to handle and to apply to a patient. The dressings are not self-supporting, and may wrinkle or stick to themselves during application. The wrinkles formed may produce thin channels through which fluid is able to leak. Accordingly, the dressings may become useless, and must ultimately be discarded.

In order to facilitate the handling of thin adhesive dressings, a release liner may be attached to the adhesive skin contact layer. However, once the release liner has been removed, the adhesive layer can still wrinkle and adhere to itself. Furthermore, when the release liner is removed, the edges of the adhesive skin contact layer (and the dressing) may have a tendency to curl.

Thin adhesive dressings are often applied following surgery, and should initially be sterile for medical applications. Sterile application of the dressing is key to avoid the risk of wound infections. Users, such as clinicians must often apply the dressings under strict aseptic conditions, particularly if the dressings are used in a surgical setting. It is important not to touch the surface of the dressing in order to avoid bacterial contamination.

Various attempts have been made to facilitate the handling and application of thin adhesive dressings. For example, US2009/0105670 discloses a composite structure comprising a cover, a stiffener and a releasable liner. The stiffener and the releasable liner, which comprises three laterally located sections, provide stiffness to the composite structure and prevents the dressing from sticking to itself and wrinkle upon application. The stiffener is releasably secured to the upper surface of the cover and includes a handle being more rigid than the principal portion of the stiffener.

U.S. Pat. No. 4,614,183 discloses a polymeric film dressing whose adhesive surface is covered by a release paper liner formed in three laterally disposed sections. The central section is arranged to be removed first, and the dressing is grasped by the two side sections to place it in the desired position. Finally, the side sections are removed to complete the securement of the dressing to a wound.

EP3373874B1 discloses a bordered dressing comprising a release liner releasably attached to an adhesive skin contact layer. The release liner comprises at least two removable portions separated by a dividing line provided at a distance of less than 15 mm from the wound pad edge. The dressing may thus be arranged precisely at the end of an incision.

While the above described documents offer solutions to the problem of handling thin film dressings or bordered dressings with a thin border portion, there are still improvements to be made in this field.

Particularly, there is a need to improve and to simplify the procedure to apply thin adhesive dressings to avoid, or at least significantly reduce, the formation of wrinkles while also preventing bacterial contamination during application.

SUMMARY

In view of the above mentioned problems, it is an object of the present disclosure to provide improvements in the field of thin adhesive dressings and to provide a wrinkle-free and sterile application of such dressings.

According to a first aspect of the present disclosure, there is provided a dressing comprising a backing layer, an adhesive skin contact layer and a first release liner, wherein the adhesive skin contact layer comprises a central portion and an edge portion surrounding the central portion, wherein the first release liner is configured to be releasably attached to at least the central portion of the adhesive skin contact layer, wherein the dressing comprises a second release liner arranged between the first release liner and at least a part of the edge portion of the adhesive skin contact layer.

The present disclosure is based on the realization that the provision of two removable release liners allows for the dressing to be applied in a smooth and wrinkle-free manner. The release liners are removed in a step-wise manner such that the thin adhesive skin contact layer is applied to the skin of a wearer in at least two steps. In a first step, the first release liner is removed, and the central portion of the adhesive skin contact layer is applied onto the skin, wound or incision of a patient. The central portion may be gently and precisely anchored onto the skin. If the dressing comprises an absorbent pad, the area surrounding the pad edges may be smoothened out, as this area is particularly prone to wrinkle formation.

In the next step, when the adhesive skin contact layer is already partially attached to the skin, the second release liner is removed from the edge portion of the adhesive skin contact layer. The peripheral edges of the dressing are thereby attached to the skin.

An applicator, such as a caregiver, may choose to either remove the first release liner completely prior to securing the central portion of the adhesive skin contact layer (and the dressing) or to remove the first release liner in a gradual manner while simultaneously positioning the uncovered adhesive skin contact layer to the skin and smoothen the central portion of the adhesive skin contact layer to the skin.

The second release liner is configured to be releasably attached to at least a part of the edge portion of the adhesive skin contact layer.

The first release liner is configured to cover the adhesive skin contact layer and the second release liner. This way, undesirable contaminants are prevented from entering the dressing prior to application of the dressing. The second release liner is configured to cover only the edge portion; i.e. the peripheral edges of the adhesive skin contact layer (and the dressing). The purpose of the second release liner is to prevent the formation of wrinkles at the edges of the dressing. It is important that the edges are attached in a flat and even manner to avoid the formation wrinkles, as such wrinkles may form thin channels through which fluid can leak. The wear time of the dressing may thereby be improved by means of the configuration of the first and the second release liners. The second release liner also prevents the edge portion from "curling" when the first release liner is removed. Furthermore, the second release liner prevents the dressing from becoming stuck to itself before application.

The dressing of the present disclosure may be used on all types of wounds, incisions and even on intact skin (if the purpose of the dressing is to prevent wounds from occurring in the first place). The dressing is advantageously used on larger wounds or scars and may be of a relatively large size. The application of larger sized dressing is typically more complicated, as a larger sized dressing has an increased tendency to stick to itself, and wrinkles are easily formed, particularly at the edge portion of the dressing. The dressing of the present disclosure is also advantageously used on dressings comprising large and "flimsy" border portions. It should however be noted that the present disclosure has several advantages with smaller sized dressings as well. For example, a smaller sized border dressing may suffer from the same problem of "curling" when the first release liner is removed.

In embodiments, the second release liner is arranged to follow the contour of at least 70%, preferably at least 80% of the edge portion of the adhesive skin contact layer.

Preferably the second release liner is arranged to follow the contour of the entire edge portion of the adhesive skin contact layer.

The second release liner is thus arranged as a "frame" or at least a partial frame around the peripheral edges of the adhesive skin contact layer.

Typically, the edge portion constitutes from 0.3 to 30%, preferably from 0.4 to 15% of the surface area of the adhesive skin contact layer.

The surface area of the edge portion may vary depending on the size and the shape of the dressing. If the dressing comprises an absorbent pad being contoured by border portion, the surface area of the edge portion may vary depending on the size of the border portion. For example, a larger border portion may require a larger edge portion being covered by a second release liner, and vice versa.

In embodiments, the second release liner comprises a first tab configured to extend beyond the periphery of the adhesive skin contact layer and being arranged on a first edge of the edge portion of the adhesive skin contact layer.

The first tab of the second release liner may be used to aid in the positioning of the dressing onto the skin. Upon the gradual removal of the first release liner, the applicator (e.g. a caregiver) may hold the first tab with one hand, while using the other hand to remove the first release liner and simultaneously anchor the central portion of the adhesive skin contact layer onto the skin, e.g. onto a scar of the skin. The fact that the first tab extends beyond the periphery of the adhesive skin contact layer allows the applicator (e.g. a caregiver) to hold the dressing in an area outside the adhesive skin contact layer, thereby avoiding undesired interference with this layer, which is to contact the skin of a wearer.

Subsequently, the first tab may be utilized to remove the second release liner to secure the edge portion of the adhesive skin contact layer onto the skin in a substantially wrinkle-free manner.

Preferably, the second release liner comprises a second tab configured to extend beyond the periphery of the adhesive skin contact layer and being arranged on second edge, opposite of the first edge, of the edge portion of the adhesive skin contact layer.

This allows the dressing, in the initial application phase, to be held straight and in a stretched state, and thereby avoid the adhesive skin contact layer to adhere to itself during application. It also allows the applicator to choose either one of the first or the second tab to initiate the removal of the second release liner. Furthermore, the dressing can be held in an area outside the dressing surface; i.e. outside the adhesive skin contact layer, thereby preventing undesired interference with the part of the dressing that is to be applied onto the skin or wound of a patient. The risk for bacterial contamination and undesired intervention with the wound or skin site is thereby greatly reduced.

In embodiments, the first release liner comprises at least one gripping tab configured to extend beyond the periphery of the adhesive skin contact layer and to overlap the first and/or the second tab.

The gripping tab of the first release liner serves to facilitate the removal of the first release liner. The gripping tab acts as a "handle" that the applicator can grasp to start the removal of the first release liner.

In embodiments, the gripping tab and the first or the second tab have a different surface structure.

This is beneficial since the gripping tab is configured to overlap the first or the second tab of the second release liner. If the gripping tab is co-extensive with the first or the second tab, it may be difficult to grasp the gripping tab and separate it from the first or second tab. A difference in surface structure between the overlapping tabs avoids this problem and facilitates the removal of the first release liner.

In embodiments, the gripping tab is embossed.

The embossed gripping tab imparts a slight separation between the gripping tab and the first or the second tab, and is a simple means to yield a different surface structure.

In alternative embodiments, the tab of the second release liner, underlying the gripping tab, is embossed.

In embodiments, the second release liner comprises at least a first and a second removable portion.

The second release liner may thus be removed in two steps, which secures an even and more controlled and wrinkle free application of the edge portion of the adhesive skin contact layer onto the skin. Accordingly, the dressing will be anchored to the skin of a wearer in three steps.

In embodiments, the first and the second removable portions of the second release liner are configured to extend between the first and the second tabs of the second release liner.

Typically, the first and the second tabs of the second release liner are integral with the removable portions. The tabs may constitute the distal ends of the first, and the second removable portions, respectively. Accordingly, the second release liner is ultimately removed from the dressing in an area outside of the adhesive skin contact layer. This is advantageous as the application of the dressing onto the skin is carried out in a sterile manner.

In embodiments, each of the first and the second tab is divided into two tab pieces and wherein each tab piece forms the distal end portion of the first and the second removable portions of the second release liner.

Accordingly, the second release liner is divided at two positions; i.e. at the respective tab, and the user may choose either one of the first or second tabs and either one of the tab pieces to grasp to start the removal of the second release liner. Each removable portion is removed in an area outside of the adhesive skin contact layer, thereby preventing contaminating the surface that is to contact the skin or wound of a wearer.

In alternative embodiments, only one of the first and second tabs is divided into two tab pieces, and the second release liner is removed gradually from the edge portion of the adhesive skin contact layer in one step. In embodiments, the first and the second tab are divided into two tab pieces by means of a dividing line, wherein the dividing line is a cutting line or a score line.

Accordingly, the tab pieces of the first and the second tab are either fully separated or partially separated.

The provision of a cutting line may facilitate the removal of the removable portions of the second release liner.

The provision of a score line may be beneficial from a manufacturing point of view. Furthermore, the score line allows the applicator to choose, after initiating the removal of the first removable portion, whether to continue the removal of both removable release liner portions in one step, or to first remove the first removable portion, and subsequently remove the second removable portion.

In embodiments, the dividing line is arranged in an offset manner such that the size; i.e. lateral extension of the respective tab piece of the first and/or second tab is different.

Accordingly, in embodiments, the dressing has a lateral (x) extension and a longitudinal (y) extension and wherein the adhesive skin contact layer is contoured by a pair of lateral edges and a pair of longitudinal edges, wherein the first and the second tabs are configured to extend beyond the periphery of the lateral and the longitudinal edges of the adhesive skin contact layer, and wherein the dividing line is configured to divide the first and the second tab into a respective first tab piece and a second tab piece, wherein the lateral extension of the first tab piece of the first tab is larger than the lateral extension of the second tab piece of the first tab, and wherein the lateral extension of the first tab piece of the second tab is smaller than the lateral extension of the second tab piece of the second tab.

In such embodiment, a caregiver typically grasps the smaller tab piece; i.e. the tab piece arranged closer to the corner of the adhesive skin contact layer to initiate the removal of the respective removable portion. This may be beneficial to facilitate the removal of the removable portions and to avoid the formation of wrinkles when adhering the edge portion of the adhesive skin contact layer to the skin. Less forces are required to initiate the removal of the second release liner.

In embodiments, the second release liner comprises a plurality of slits extending through the second release liner.

The slits are provided to facilitate the removal of the second release liner from the edge portion of the adhesive skin contact layer. The slits render the second release liner more flexible and pliable.

In embodiments, at least 80% of the slits are configured to extend in the same direction as the extension of the edge portion; i.e. the peripheral edges of the adhesive skin contact layer.

The slits are thereby arranged in the direction of which the second release liner is to be removed. This way, the second release liner becomes more pliable and facilitates its removal from the edge portion of the adhesive skin contact layer.

In embodiments, the dressing further comprises an absorbent pad arranged between the backing layer and the adhesive skin contact layer, wherein the backing layer and the adhesive skin contact layer are configured to extend beyond the periphery of the absorbent pad to define a border portion along the contour of the absorbent pad.

Accordingly, the dressing is a bordered dressing and is preferably used with exuding wounds and/or scars.

In embodiments, the edge portion of the adhesive skin contact layer constitutes of from 10 to 60%, such as from 30 to 50% of the surface area of the border portion.

In other words, the absorbent pad is surrounded by a portion of the adhesive skin contact layer which is not covered by the second release liner. This way, upon the removal of the first release liner and during application of the dressing to the skin, the adhesive area surrounding the absorbent pad may be gently attached to the skin in a controlled manner. The area surrounding the absorbent pad; i.e. near the edges of the absorbent pad, is particularly prone to wrinkle formation. Therefore, in the first application step of the dressing onto the skin, the area circumventing the pad edges is smoothened out, and in a second application step, the edge portion of the adhesive skin contact layer is secured to the skin.

According to another aspect, there is provided a process for manufacturing a dressing comprising a first and a second release liner; the process comprising:

providing a dressing comprising a backing layer and an adhesive skin contact layer, and optionally, an absorbent pad arranged between the backing layer and the adhesive skin contact layer, wherein the adhesive skin contact layer comprises a central portion and an edge portion surrounding the central portion, applying a second release liner to at least a part of the edge portion of the adhesive skin contact layer, and applying a first release liner to the central portion of the adhesive skin contact layer, wherein the second release liner is arranged between the edge portion of the adhesive skin contact layer and the first release liner.

The process may further comprise:

providing a plurality of slits in the second release liner, wherein at least 80% of the slits are configured to extend in the same direction as the extension of the edge portion of the adhesive skin contact layer.

Further features of, and advantages with, the present disclosure will become apparent when studying the appended claims and the following description. The skilled addressee realizes that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which:

FIG. 3 schematically illustrates a process for manufacturing a dressing according to an exemplary embodiment of the present disclosure.

DETAILED DESCRIPTION

Figure 1A:
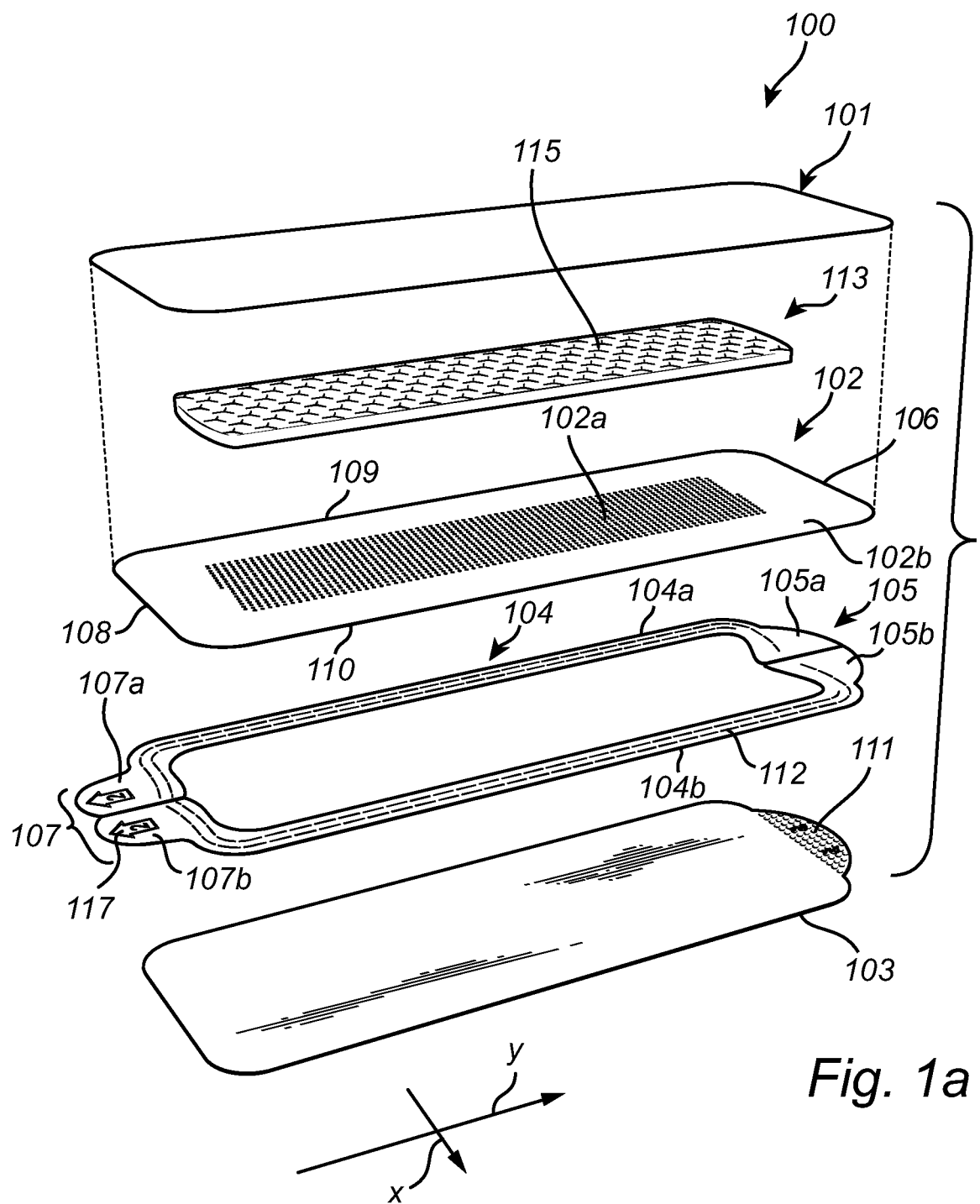
FIG. 1a is a split-view of a dressing according to an exemplary embodiment of the present disclosure.

The present disclosure will now be described more fully hereinafter with reference to the accompanying drawings, in which currently preferred embodiments of the present disclosure are shown. The present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like elements throughout.

FIG. 1a illustrates a dressing 100 comprising a backing layer 101, an adhesive skin contact layer 102 and a first release liner 103, wherein the adhesive skin contact layer 102 comprises a central portion 102a and an edge portion 102b surrounding the central portion 102a, wherein the first release liner 103 is configured to be releasably attached to at least the central portion 102a of the adhesive skin contact layer 102, wherein the dressing 100 comprises a second release liner 104 arranged between the first release liner 103 and at least a part of the edge portion 102b of the adhesive skin contact layer 102.

The second release liner 104 is configured to be releasably attached to at least a part of the edge portion 102b of the adhesive skin contact layer 102.

As used herein, the term "dressing" means a wound dressing for application onto an existing wound, incision or a scar. The term "dressing" also incorporates dressings for the purpose of preventing wounds, such as pressure ulcers, from occurring in the first place. The dressing of the present disclosure may thus be applied to a wound or a scar or to intact skin.

As used herein, the term "adhesive skin contact layer" means the layer of the dressing configured to be attached to the skin or the wound of a wearer. The adhesive skin contact layer is arranged to detachably adhere the dressing to a dermal surface. This layer may also be referred to as a "wound contact layer".

As used herein, the term "edge portion" means the peripheral edges of the adhesive skin contact layer. The edge portion is configured to surround the central portion of the adhesive skin contact layer. The edge portion of the adhesive skin contact layer is the portion at which the second release liner is applied. The edge portion may have a width, w1, as measured from the peripheral edge and extending into the dressing, of from 0.5 to 2.5 cm, e.g. from 0.8 to 1.5 cm.

The edge portion 102b typically constitutes of from 0.3 to 30%, e.g. from 0.4 to 15% of the surface area of the adhesive skin contact layer 102.

The "central portion" of the adhesive skin contact layer may constitute of from 70 to 99.7% of the surface area of the adhesive skin contact layer. The dimensions of the central portion, and the edge portion, respectively, may vary depending on the shape and the size of the dressing. The dimensions may also vary depending on the size and shape of the absorbent pad (if present); i.e. depending on the size and shape of the border portion of the dressing. In embodiments of the present disclosure, an absorbent pad is arranged in the central portion of the adhesive skin contact layer. If an absorbent pad is arranged in the central portion, the border portion circumventing the absorbent pad is typically not covered by the second release liner. Instead, only the edge portion of the border portion is covered by the second release liner.

In the context of the present disclosure, the first release liner 103 is releasably attached to at least the central portion 102a of the adhesive skin contact layer 102. The second release liner 104 is releasably attached to at least a part of the edge portion 102b of the adhesive skin contact layer 102.

As used herein, the term "releasably attached" means that the first 103 or the second 104 release liner may be peeled away from the rest of the dressing by hand. The first 103 or the second 104 release liners and any portions thereof are attached such that the portions remain attached absent a separation force applied to one or all of the portions, and where the portions are capable of being separated upon the application of a separation force.

The first release liner 103 is configured to cover the adhesive skin contact layer 102 and the second release liner 104. Accordingly, the first release liner 103 is configured to extend across the entire surface area of the adhesive skin contact layer 102. Accordingly, the first release liner 103 may act as a barrier that protects the sterility of dressing, including all of its layers, before the dressing 100 is used.

The first release liner 103 is configured to be attached to at least the central portion 102a of the adhesive skin contact layer 102. The first release liner 103 may, in embodiments, be adhesively attached to second release liner 104. Preferably, however, the first release liner 103 overlies the second release liner 104, but is not adhesively attached thereto.

The second release liner 104 is arranged to follow the contour of at least 70%, preferably at least 80%, more preferably at least 90% of the edge portion 102b of the adhesive skin contact layer 102.

Figure 1B:
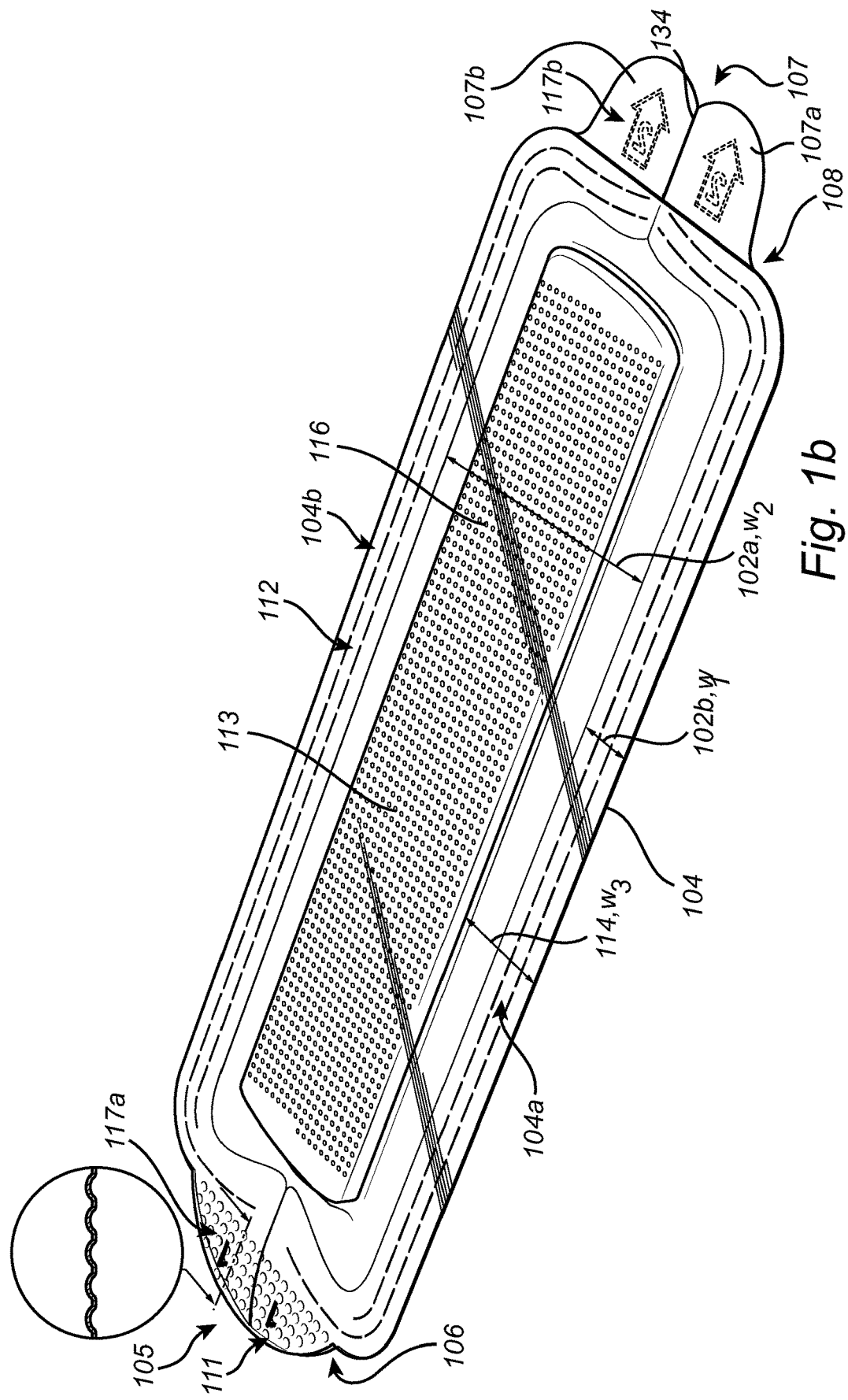
FIG. 1b illustrates a dressing according to an exemplary embodiment of the present disclosure, as seen from the underside and wherein the first release liner is transparent.

As illustrated in FIGS. 1a and 1b, the second release liner is arranged to follow the contour of the entire edge portion 102b of the adhesive skin contact layer 102. This is beneficial to secure a wrinkle-free attachment of the edge portion 102b of the adhesive skin contact layer 102 to the skin.

The first release liner 103 and the second release liner 104 may be formed from the same material or from different materials. The thickness of the first 103, and the second release liner 104, may be the same or different.

The first 103 and or second 104 release liner may be made of any of a variety of suitable materials known in the art, e.g. polyethylene, polyester, polypropylene and silicone coated paper. For example, the release liner may be a polyethylene film having a thickness in the range of from 30 to 300 μm, e.g. from 50 to 150 μm.

The second release liner 104 comprises a first tab 105 configured to extend beyond the periphery of the adhesive skin contact layer 102 and being arranged on a first edge 106 of the edge portion 102b of the adhesive skin contact layer 102.

As illustrated in FIGS. 1a and 1b, the second release liner 104 comprises a second tab 107 configured to extend beyond the periphery of the adhesive skin contact layer 102 and being arranged on second edge 108, opposite of the first edge 106, of the edge portion 102b of the adhesive skin contact layer 102.

The first 105 and/or the second 107 tabs constitute a gripping means that the applicator can use to hold and stretch the dressing 100 after the first release liner 103 has been removed, and the remaining parts of the dressing 100 are to be anchored to the skin. The fact that the tab(s) extend beyond the periphery the adhesive skin contact layer 102 is beneficial to avoid unnecessary interference with the adhesive surface during application. A sterile application of the dressing is thus achieved.

The dressing illustrated in FIG. 1a is rectangular and has a lateral (x) and a longitudinal (y) extension. The adhesive skin contact layer 102 is contoured by a pair of lateral edges 109 and 110 extending in parallel to each other in the longitudinal direction, and a pair of longitudinal edges 106 and 108 extending in parallel to each other in the lateral direction. The lateral and the longitudinal edges are, in FIG. 1a, illustrated with respect to the adhesive skin contact layer 102, however the edges of the backing layer 101, and the dressing 100 correspond to the edges of the adhesive skin contact layer 102.

As used herein, the term "lateral extension" or "lateral direction" is a direction running parallel to the minimum linear dimension of the dressing. The lateral direction is parallel to the x axis in the drawings.

A "lateral edge" of the dressing, absorbent pad, adhesive skin contact layer or the release liner or any of its portions is an edge that extends in the longitudinal direction; i.e. parallel to the y axis.

The "longitudinal extension" or "longitudinal direction" is orthogonal to the lateral extension or direction. The longitudinal direction is consequently parallel to the y axis in the drawings.

A "longitudinal edge" of the dressing, absorbent pad, adhesive skin contact layer or the release liner or any of its portions is an edge that extends in the lateral direction, i.e. parallel to the x axis.

The dressing 100 of the present disclosure is not, however, limited to a particular shape. The dressing may for example be square shaped or oval. Alternatively, if the dressing is to be applied to the sacrum or heel of a wearer, the dressing 100 may be generally "heart shaped" or "butterfly shaped".

In FIGS. 1a and 1b, the first 105 and the second 107 tabs of the second release liner 104 are configured to extend beyond the periphery of the longitudinal edges 106 and 108 of the adhesive skin contact layer 102.

The first release liner 103 comprises at least one gripping tab 111 configured to extend beyond the periphery of the adhesive skin contact layer 102 and to overlap the first 105 and/or the second tab 107.

In FIGS. 1a and 1b, the gripping tab 111 overlaps the first tab 105 of the second release liner 104. The gripping tab 111 acts as a handle that the applicator can grasp to remove the first release liner 103 from the adhesive skin contact layer 102.

Preferably, the gripping tab 111 and the first 105 or the second 107 tab have a different surface structure. This is to facilitate removal of the gripping tab 111 from the underlying first 105 or second tab 107.

As illustrated in FIGS. 1a and 1b, the gripping tab 111 is embossed. The embossed surface structure of the gripping tab 111 is illustrated in the zoomed-in picture in FIG. 1b.

It is also conceivable within the scope of the present disclosure, that the first 105 or the second 107 tab of the second release liner 102 underlying the gripping tab 111 is embossed.

It is also conceivable within the scope of the present disclosure that the first release liner 103 including the gripping tab 111 is embossed.

The second release liner 104 may be configured to be removed in one step. For example, an applicator may grasp the first tab, or the second tab, if present, to start the removal of the second release liner 104. The second release liner 104 may be arranged as a frame configured to follow the contour of the edge portion (i.e. the peripheral edges) of the adhesive skin contact layer 102. An end portion of the second "release liner frame" may be arranged in close proximity of the first tab 105. One hand may be used to remove the second release liner 104 from the edge portion 102b of the adhesive skin contact layer 102a, while the other hand can be used to secure a wrinkle-free attachment of the dressing edges.

Alternatively, the second release liner 104 is configured to be removed in two steps. This may improve the controlled attachment of the edge portion 102b of the adhesive skin contact layer 102 to the skin.

As illustrated in FIGS. 1a and 1b, the second release liner 104 comprises at least a first 104a and a second 104b removable portion.

The first 104a and the second 104b removable portions of the second release liner 104 are configured to extend between the first 105 and the second 107 tabs of the second release liner 104.

In FIGS. 1a and 1b, each of the first 105 and the second 107 tab is divided into two tab pieces (105a, 105b, 107a, 107b) and wherein each tab piece (105a, 105b, 107a, 107b) forms the distal end portion of the first 104a and the second 104b removable portions of the second release liner 104.

The first 105 and/or the second 107 tab may be divided by a dividing line 134 into a first (105a, 107a) and a second (107a, 107b) tab piece. The dividing line may be a cutting line or a score line.

As used herein, the term "cutting line" means that the first 105 and/or the second tab 107 are cut into two respective tab pieces. Accordingly, the first (105a, 107a) tab piece is fully separated from the second (107a, 107b) tab piece and arranged in a side-by-side relationship.

As used herein, the term "score line" means a partially cut or perforated line. Accordingly, the first (105a, 107a) tab piece is partially, but not fully, separated from the second (107a, 107b) tab piece and arranged in a side-by-side relationship. The score line allows the applicator to separate the two tab pieces by tearing the pieces apart prior to removing the removable portions (104a, 104b) of the second release liner 104.

As illustrated in FIGS. 1a and 1b, both tabs comprise a dividing line 134 and two respective tab pieces. If the size of the dressing is smaller, only one of the tabs may be divided by a dividing line 134. The second release liner 104 is thus removed in one step, starting from a first tab piece, and ending when reaching the second tab piece arranged outside of the adhesive dressing surface.

In alternative embodiments, the first tab 105 is divided by a score line and the second tab 107 is divided by a cutting line (or vice versa).

The provision of a score line may be beneficial for manufacturing purposes, e.g. to keep the tab pieces together during assembly of the dressing. The score line furthermore allows the applicator to choose whether to continue removing the first 104a and the second 104b removable portions in one step, or to first remove the first removable portion 104a, and subsequently remove the second removable portion 104b.

When an applicator reaches the score line, he/she will perceive a difference in the retention force, thus reminding him/her to temporarily stop the removal of the first removable portion (or continue if desired).

In FIGS. 1a and 1b, the dividing line 134 is arranged in a central position with respect to the respective lateral edge (106, 108). It is, however, conceivable to arrange the dividing line 134 in an "offset" arrangement. For example, the size of the respective tab piece of the first and/or second tab may be different. The lateral extension of one of the respective tab pieces may be larger than the other.

Figure 1C:
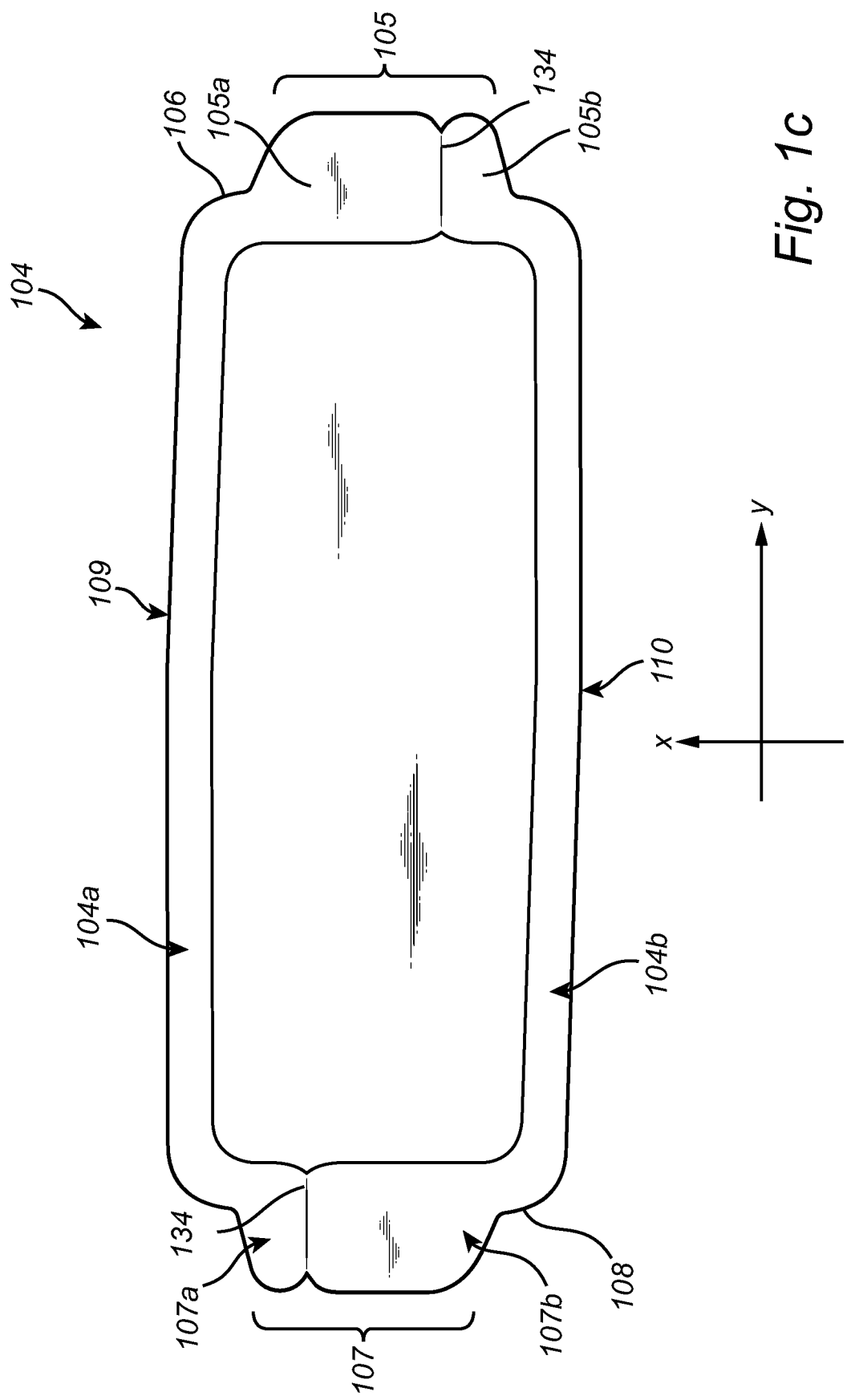
FIG. 1c illustrates a top-view of the second release liner according to an exemplary embodiment of the present disclosure, wherein the tab pieces of the first and second tabs are arranged in an offset manner.

FIG. 1c illustrates a second release liner 104 with such an offset arrangement.

Accordingly, in embodiments, the dressing has a lateral (x) extension and a longitudinal (y) extension and wherein the adhesive skin contact layer (not shown) is contoured by a pair of lateral edges (106, 108) and a pair of longitudinal edges (109, 110), wherein the first 105 and the second 107 tabs are configured to extend beyond the periphery of the lateral (106, 108) and the longitudinal (109, 110) edges of the adhesive skin contact layer, and wherein the dividing line 134 is configured to divide the first 105 and the second 107 tab into a respective first tab piece and a second tab piece, wherein the lateral extension of the first tab piece 105a of the first tab 105 is larger than the lateral extension of the second tab piece 105b of the first tab 105, and wherein the lateral extension of the first tab piece 107a of the second tab 107 is smaller than the lateral extension of the second tab piece 107b of the second tab 107.

In FIG. 1c, no adhesive skin contact layer is present so the lateral and longitudinal edges are illustrated with respect to the second release liner 104 (in the area where the adhesive skin contact layer is to be arranged in a dressing).

In such embodiments, the caregiver typically grasps one of the smaller tab pieces (e.g. the second tab piece 105b of the first tab 105 or the first tab piece 107a of the second tab 107) to initiate the removal of one of the removable portions (104a, 104b) of the second release liner 104.

This may be beneficial to facilitate the removal of the removable portions and to avoid the formation of wrinkles when adhering the edge portion of the adhesive skin contact layer to the skin. Less forces are required to initiate the removal of the second release liner.

For example, a caregiver may first grasp the second, smaller tab 105a, which is arranged closer to the dressing corner, and end the removal of the second removable portion 104b when reaching the dividing line 134. The caregiver may then initiate the removal of the first release liner portion 104a by grasping the first, smaller tab 107a, and subsequently remove the first release liner portion from the adhesive surface of the skin contact layer.

The first tab piece 105a of the first tab 105 and the first tab piece 107a of the second tab form the distal end portions of the first removable portion 104a. The second tab piece 105b of the first tab 105 and the second tab piece 107b of the second tab 107 form the distal end portions of the second removable portion 104b.

The second release liner 104 may comprise a plurality of cuts extending through the second release liner 104.

The cuts may have any shape. Preferably however, the cuts are provided as slits 112, as illustrated in FIGS. 1a and 1b.

The slits 112 are configured to follow the contour of the second release liner 104. Accordingly, the slits are provided to follow the contour of the edge portion 102b; i.e. the peripheral edges of the adhesive skin contact layer 102 (and the dressing 100). The slits 112 render the second release liner 104 pliable such that it can be removed in a simple manner by only utilizing one hand. Since the first release liner 103 is configured to cover; i.e. overlie, the second release liner 104, the dressing is still protected from undesired contaminants. Accordingly, the provision of slits 112 in the second release liner 104 does not jeopardize the sterility before or during application of the dressing.

At least 80% of the slits 112 are configured to extend in the same direction as the extension of the edge portion 102b; i.e. the peripheral edges of the adhesive skin contact layer 102 (and the dressing 100).

The peripheral edges are, in FIG. 1, defined by the lateral edges (106 and 108) and the longitudinal edges (109 and 110).

Preferably, at least 90% of the slits 112 are configured to extend in the same direction as the extension of the peripheral edges of the dressing 100.

The slits may be provided in one row of longitudinally extending slits 112 arranged in parallel with the peripheral edges of the adhesive skin contact layer 102. Alternatively, the slits may be provided in two or three rows of longitudinally extending slits 112.

In FIGS. 1a and 1b, the dressing 100 comprises an absorbent pad 113 arranged between the backing layer 101 and the adhesive skin contact layer 102, wherein the backing layer 101 and the adhesive skin contact layer 102 are configured to extend beyond the periphery of the absorbent pad 113 to define a border portion 114 along the contour of the absorbent pad 113.

The inventive concept is particularly beneficial for border dressings comprising an absorbent pad. As mentioned hereinbefore, gaps and wrinkles may form around the edges of the pad, which is typically thicker than the backing layer and the adhesive skin contact layer. The area surrounding the pad edges may thus be attached to the skin in a controlled and substantially wrinkle-free manner.

As illustrated in FIG. 1a, the absorbent pad 113 comprises a plurality of cuts 115 extending at least partially through the absorbent pad 113. The cuts 115, which may have various shapes, render the pad more flexible, and enhances the flexibility of the entire dressing.

The cuts 115 illustrated in FIG. 1a each comprises three incisions extending from a common starting point. The angle between such incisions may be between 40 and 150°. Accordingly, the pad or pad layer(s) is/are cut in both the longitudinal (y) and lateral (x) directions of the pad such that the pad becomes flexible in all directions.

The absorbent pad 113 may comprise one or a plurality of layers. If the absorbent pad 113 comprises several pad-forming layers, the cuts 115 may extend in at least one of such layers.

The absorbent pad is arranged in the central portion of the dressing. The edge portion 102b of the adhesive skin contact layer 102 constitutes of from 10 to 60%, e.g. from 30 to 50% of the surface area of the border portion 114.

In other words, the area circumventing the absorbent pad is not covered by the second release liner, but is instead used to firmly anchor the central portion 102a of the adhesive skin contact layer 102 to prevent wrinkles from occurring in this area.

As illustrated in FIG. 1b, the width, w3, of the border portion is larger than the width, w1, of the edge portion 102b of the adhesive skin contact layer. The width, w2, of the central portion 103a, is larger than the width of the pad 113.

In the various embodiments described hereinbefore, the backing layer 101 may be a thin film, sheet or membrane that is vapor permeable. Examples of suitable materials for the backing layer include, but are not limited to polyurethane, polyethylene or polyamide films, silicone films, polyester based nonwoven materials, and laminates of polyester-based nonwoven materials and polyurethane films. Suitably, the backing layer is a polyurethane film having a thickness of from 5 to 40 µm, e.g. from 15 to 25 µm. A thin layer of adhesive, such as a polyacrylate adhesive, may be applied to the backing layer 101 to attach the backing layer 101 to the adhesive skin contact layer 102 or, where present, an absorbent pad 113 or any other layer of the dressing.

The absorbent pad 113 may comprise a foam or a gel. It may also comprise a superabsorbent material e.g. superabsorbent polymers (SAP) or superabsorbent fibers (SAF).

For example, the absorbent pad 113 may comprise two or more layers having different properties laminated together.

In embodiments, the absorbent pad 113 comprises a first absorbent layer, a liquid acquisition layer, e.g. a nonwoven, and a second absorbent layer. The first absorbent layer may be a superabsorbent layer and the second absorbent layer may comprise an absorbent foam. Typically, the superabsorbent layer is arranged between the liquid acquisition layer and the second absorbent layer, wherein the second absorbent layer is the lowermost layer of the absorbent pad 113. Suitable foam materials for use in the second absorbent layer include, but are not limited to polyurethane foams.

The superabsorbent layer may comprise a superabsorbent polymer (SAP). A "superabsorbent polymer" or "SAP" is a polymer that can absorb up to 300 times its own weight in aqueous fluids. Superabsorbent polymers are constituted by water-swellable and water insoluble polymers capable of absorbing large quantities of fluid upon formation of a hydrogel. The superabsorbent polymers for use in accordance with the present disclosure may be inorganic or organic crosslinked hydrophilic polymers, such as polyvinyl alcohols, polyethylene oxides, crosslinked polyacrylates and the like. Typically, the superabsorbent (SAP) comprise sodium acrylate. The SAP material may be in the form of particles, fibers, flakes or similar.

The liquid distributing layer may comprise any material having the ability to distribute the exudate in an efficient manner. For example, the liquid distributing layer may comprise a nonwoven material. A nonwoven imparts an appropriately balanced rigidity to the layer and to the dressing as such. It may also efficiently distribute and spread liquid absorbed by the superabsorbent layer such that it can be evaporated through the backing layer over a large surface. For example, the nonwoven may comprise viscose, polyester or blends thereof.

The layers can be joined by adhesion, lamination, using pressure and heat.

The absorbent pad 113 may comprise additional layers, such as liquid transport layers, various combinations of foam and nonwoven layers laminated together.

The absorbent pad 113 may comprise one or more biologically active substance, e.g. a compound having an antimicrobial or wound healing effect. Examples of such compounds include, but are not limited to a silver compound such as silver salt and metallic silver, biguanide salts such as polyhexamethylene biguanide (PHMB) or any salts thereof, or polyhexamethyl guanide (PHMG) or any salts thereof, or chlorhexidine or any salts thereof, iodine, salicylic acid or any salt thereof, acetyl salicylic acid or any salt thereof, quarter ammonium salts such as benzethonium chloride, povidone-iodine (betadine), lactoferrin, xylitol, antimicrobial peptides such as human cationic antimicrobial protein 18 (hCAP18 or LL37), borneol, bismuth subgallate, antifungal pharmaceuticals, and antibiotics such as gentamycin, and streptomycin.

The backing layer 101 and the adhesive skin contact layer 102 may be bonded to each other in those areas of both layers that extend beyond the periphery of the absorbent pad 113. The backing layer may also be bonded to the absorbent pad 113, e.g. by means of an adhesive, such as a pressure sensitive adhesive (e.g. a polyacrylate).

In order to achieve sufficient adhesion properties, the border portion 114 may have a width, w3, of from 10 to 50 mm, e.g. from 20 to 30 mm and extends along the contour of the absorbent pad 113. A smaller sized dressing may have a smaller border portion than a larger sized dressing. This allows for easy handling and application of the product while still maintaining sufficient adhesion upon application.

Preferably, the adhesive skin contact layer 102 comprises a silicone based adhesive. Such an adhesive is skin-friendly and permits the removal of the dressing without causing damage to the skin.

For example, the adhesive skin contact layer 102 may comprise a polymer based film and a silicone gel layer; the silicone gel layer being configured to contact the skin of a wearer.

The polymer based film is preferably a breathable film and may comprise e.g. polyethylene, polyamide or polyester polyurethane. Preferably, the polymer based film comprises polyurethane. The thickness of the polyurethane film may be from 15 to 100 µm, e.g. from 20 to 80 µm, preferably from 20 to 50 µm.

Examples of suitable silicone gels for use in the adhesive skin contact layer 102 and/or in the silicone gel layer include the two component RTV systems, such as Q72218 (Dow Corning), and SilGel 612 (Wacker Chemie AG) mentioned herein, as well as NuSil silicone elastomers. In embodiments of the invention the adhesive may comprise a soft silicone gel having a softness (penetration) of from 8 to 22 mm, e.g. from 12 to 17 mm, as measured by a method based on ASTM D 937 and DIN 51580, the method being described in European Patent Application No 14194054.4. The thickness of the silicone gel layer is typically at least 20 µm. The thickness of the silicone gel layer may be from 100 to 200 µm.

Preferably, the adhesive skin contact 102 layer comprises a plurality of apertures 116 in the area underlying the absorbent pad, but is void of apertures in the area forming the border portion 114.

The apertures 116 serve to improve the absorption of wound exudate into the dressing, and are therefore arranged in the area where absorption takes place. The area of the absorbent layer forming the border portion 114 of the dressing is preferably void of apertures. This way, the adhesion against the skin is enhanced, and the stay-on ability of the dressing is thereby prolonged.

If the adhesive skin contact layer 102 comprises a polymer based film and a silicone gel layer, the apertures 116 extend through both of these layer.

The adhesive skin contact layer 102 is arranged to receive body fluids, e.g. wound exudate from the wound while the absorbent pad 113 functions to absorb the wound exudate and transport it away from the wound by evaporating it from the top of the dressing; i.e. through the backing layer 101.

In embodiments, at least one of the adhesive skin contact layer 102, the backing layer 101 and the first release liner 103 is substantially transparent.

This is beneficial as it enables the applicator to distinguish the absorbent pad 113 from the border portion 114 such that the dressing can be positioned properly onto e.g. an incision.

Preferably, the backing layer and the adhesive skin contact layer are both transparent.

In embodiments, a material property of the first release liner and the second release liner is different, wherein the material property is selected from the composition, the thickness or the color.

The first release liner may have any colour, but is preferably white or transparent.

Typically, the first and the second release liners have a different color. For example, if the first release liner is transparent, and the second release liner is white, the contrast in color draws the attention to the user and may direct the user to remove the release liners in the correct way.

In embodiments, the gripping tab 111 and/or the first 105 or the second 107 tabs are colored. This is to further facilitate for the user to remove the release liners in a correct way. The colored tab(s) may also be conceived as desirable for aesthetic reasons, both by the health care personnel and by the patients. The color may be any color that contrasts with the color of the release liners, e.g. green, blue, purple, red, black etc. The use of a color on the gripping member or the first or second tabs creates a contrast with the first release liner, which, is typically white or substantially transparent. The contrast is provided to draw attention to part of the dressing, which is to be removed first.

The gripping tab 111 of the first release liner 103 and/or the first 105 or the second 107 tabs of the second release liner 104 may comprise a marking 117. The marking 117 may be any type of marking or indicium to denote the removal of the release liners and release liner portions. The markings are provided to indicate the order in which the release liners are to be removed and serve to guide the applicator to correctly apply the dressing onto the skin.

The marking 117 may e.g. be an arrow or a number to clarify the order of removal of the release liners.

For example, as illustrated in FIG. 1b, the first gripping tab 111 may be indicated with the marking 1 (117a) to symbolize that the first release liner 103 should be removed first. The first tab 105 of the second release liner may be indicated with a 2.

In FIGS. 1a and 1b, both tab pieces (107a and 107b) of the second tab 107 are indicated with a 2 and an arrow, since the caregiver may choose which one of the removable portions to remove first (the order does not actually matter for the purpose of the invention).

The first release liner 103 may comprise one removable portion, as illustrated in FIGS. 1 and 2. It is however conceivable that the first release liner comprises two or three removable portions. Such removable portions of the first release liner are releasably connected to each other. If the first release liner comprises more than one removable portion, the first release liner may be divided by a dividing line, wherein a first and a second removable portion of the first release liner overlaps along the dividing line. This is important to secure that the adhesive skin contact layer is fully covered and that no gaps are formed, thereby preventing contaminants from entering into the dressing. The overlapping removable portions may form a grip member that the user can grasp in order to remove the removable portion. For example, an edge of the first removable portion may be folded over itself, and the edge of the second removable portion may be configured to overlap the folded edge. This arrangement eliminates the risk of contaminating the adhesive skin contact layer 102, since the overlap between the first and second tab prevents contaminants from entering the dressing layers.

With reference to FIGS. 2a-2j, the application of a dressing according to the present disclosure is illustrated.

Figure 2A:
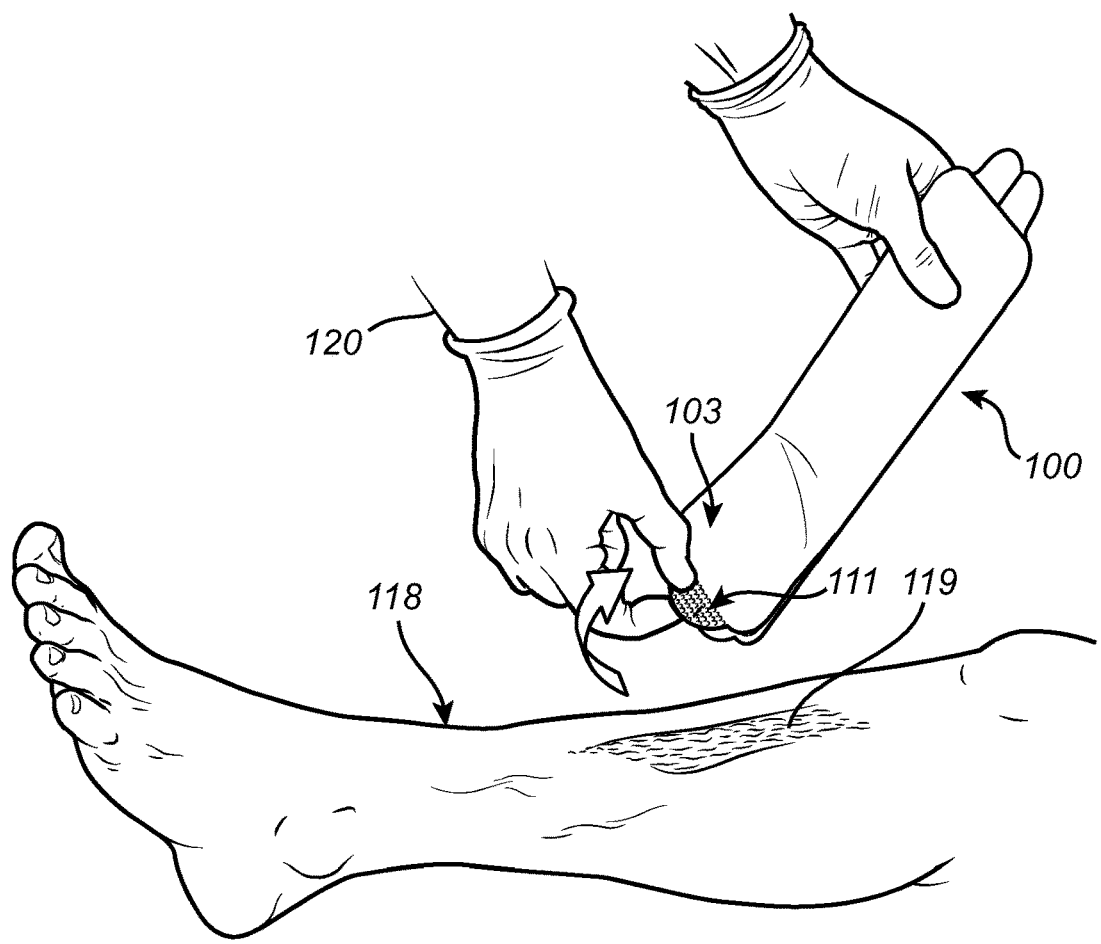
FIGS. 2a-2j illustrate a caregiver applying the dressing to the leg of a patient and the steps by which the first, and the second release liner, respectively, are removed.
Figure 2B:
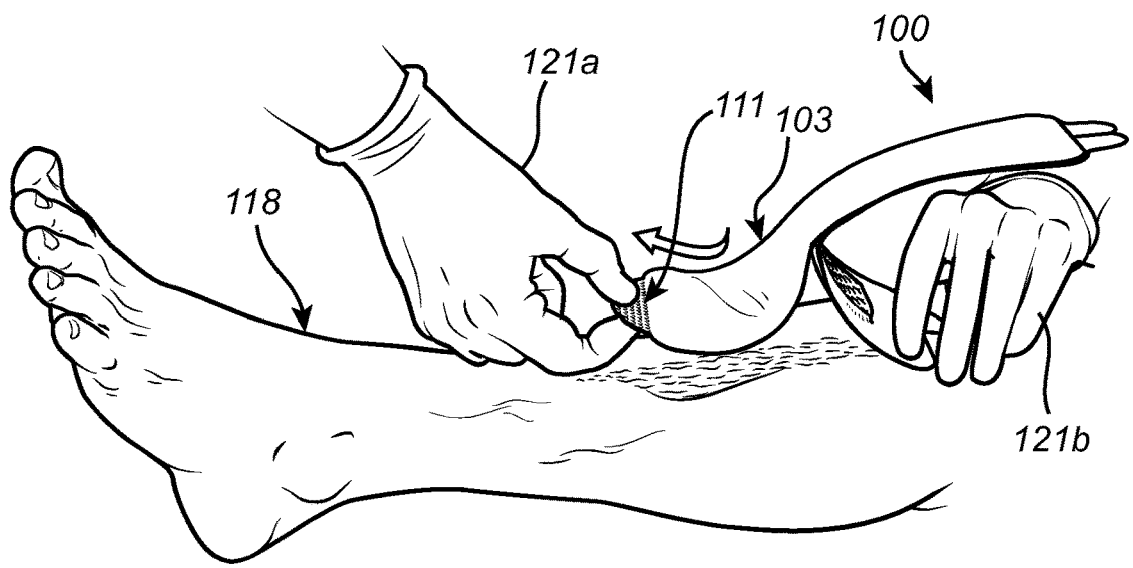
Figure 2C:
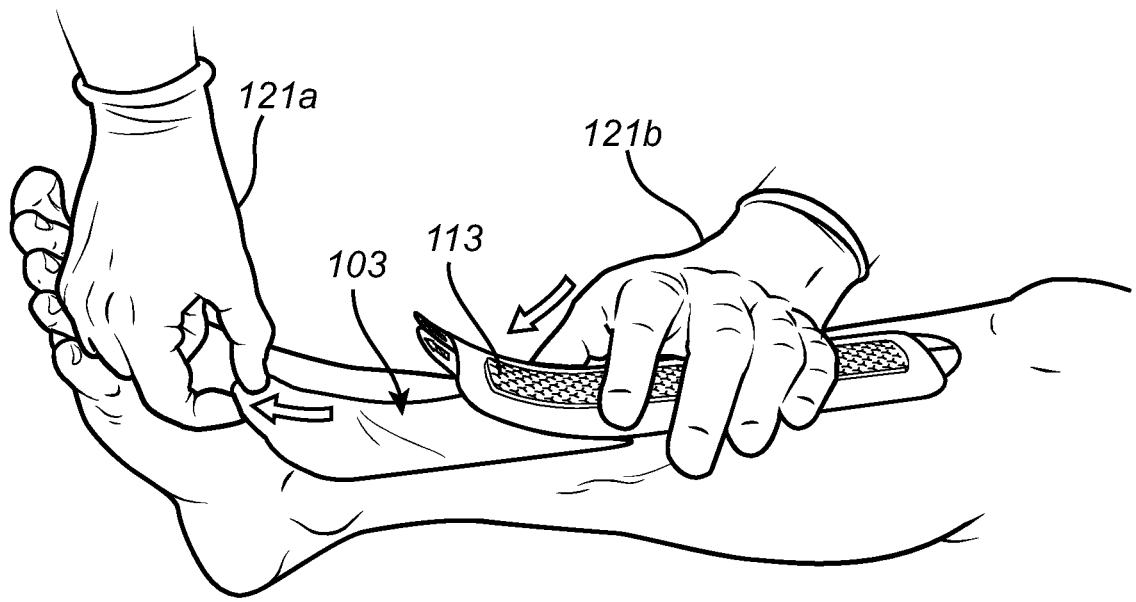

FIG. 2a illustrates the leg 118 of a patient with a wound 119 and a caregiver 120 holding a dressing 100 according to the present disclosure. In a first step (see FIGS. 2a and 2b), the caregiver 120 grasps the gripping tab 111 of the first release liner 103. One hand 121a is used to gradually remove the first release liner 103 while the other hand 121b is used to secure the dressing 100 to the skin of the patient (see FIG. 2c). During removal of the first release liner 103, or after the complete removal of the first release liner 103, the central portion of the dressing can be precisely anchored to the skin such that substantially no wrinkles are formed around the edges of the absorbent pad 113.

Figure 2D:
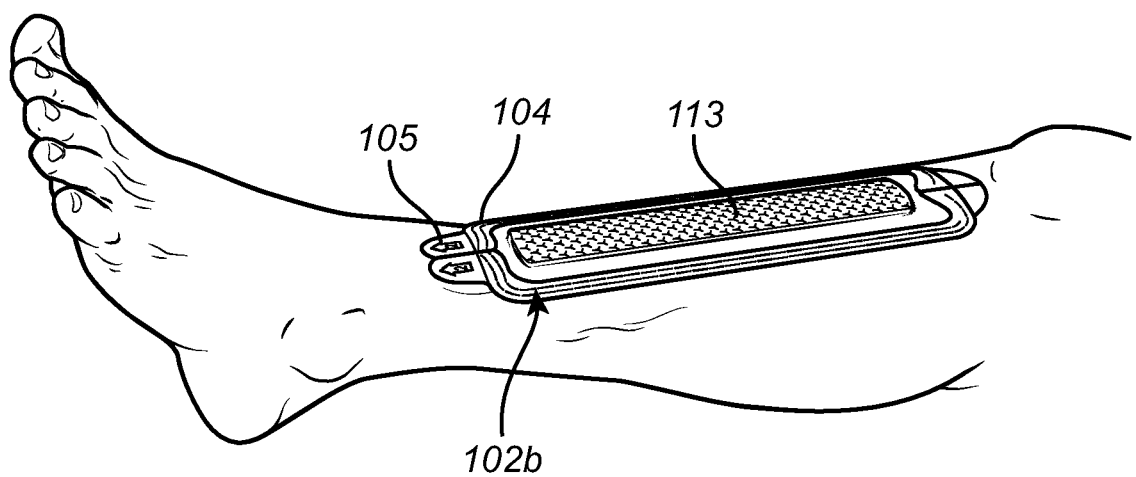
Figure 2E:
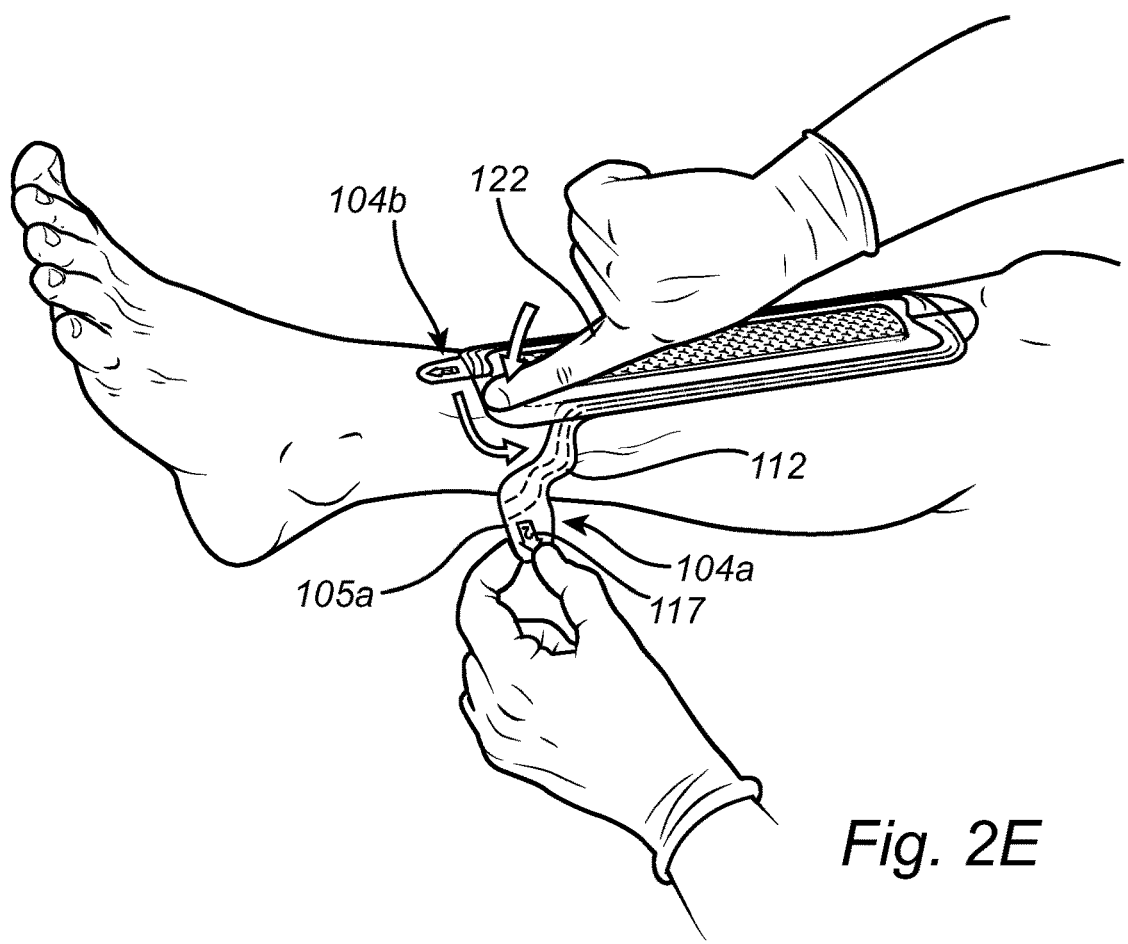

FIG. 2d illustrates the situation when the dressing 100 has been applied to the leg 118 of the patient and the first release liner 103 has been removed. The dressing 100 still comprises the second release liner 104 arranged on the edge portion 102b of the adhesive skin contact layer. The edge portion 102b is not yet adhered to the skin of the patient.

Figure 2F:
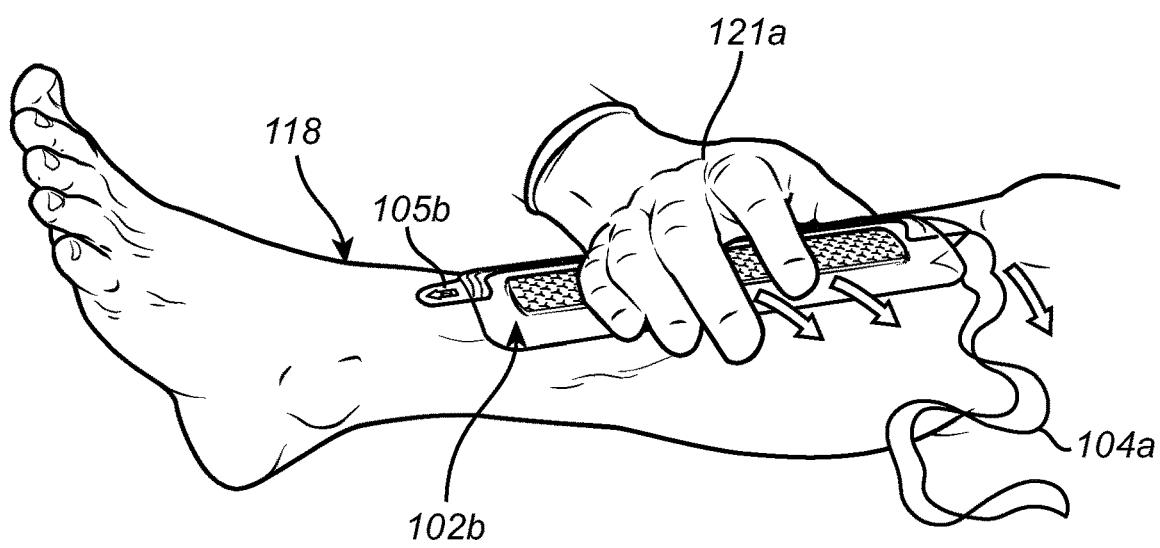

In the next step (FIGS. 2e-2f), the caregiver grasps the first tab 105 of the second release liner 104. The first tab comprises a marking 117 in the form of an arrow and is denoted 2. The second release liner 104 comprises two removable portions 104a and 104b. The first 105 and the second 107 tabs of the second release liner are divided into two tab pieces. The first tab piece 105a is integral with the first removable portion 104a and the second tab piece 105b is integral with the second removable portion 104b. The caregiver 120 uses the first tab piece 105a to remove the first removable portion 104a of the second release liner 104 (see FIG. 2e). The caregiver may use his/her finger 122 to gently press the edges of the dressing against the skin of a wearer. The slits 112 are configured to follow the contour of edge portion of the adhesive skin contact layer (and of the dressing 100). This arrangement facilitates the removal of the second release liner. FIG. 2f illustrates the step when the first removable portion 104a of the second release liner 104 has been removed. The first removable portion 104a is removed at a position outside of the dressing, and may be discarded.

Figure 2G:
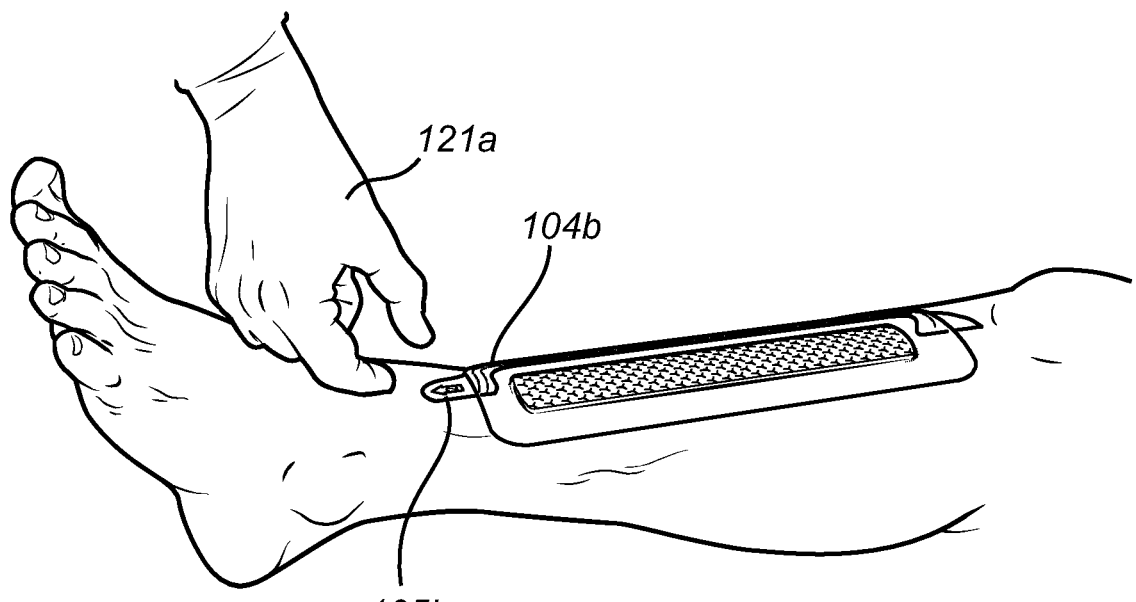
Figure 2H:
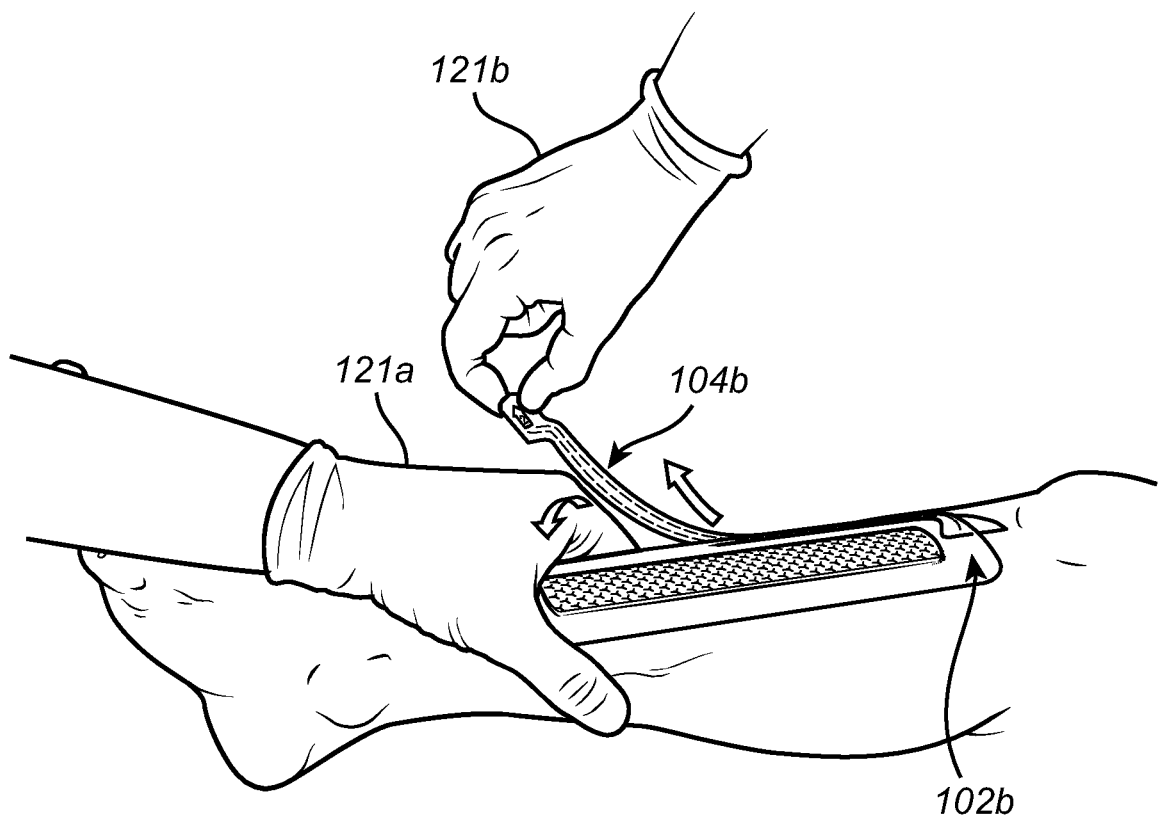
Figure 2I:
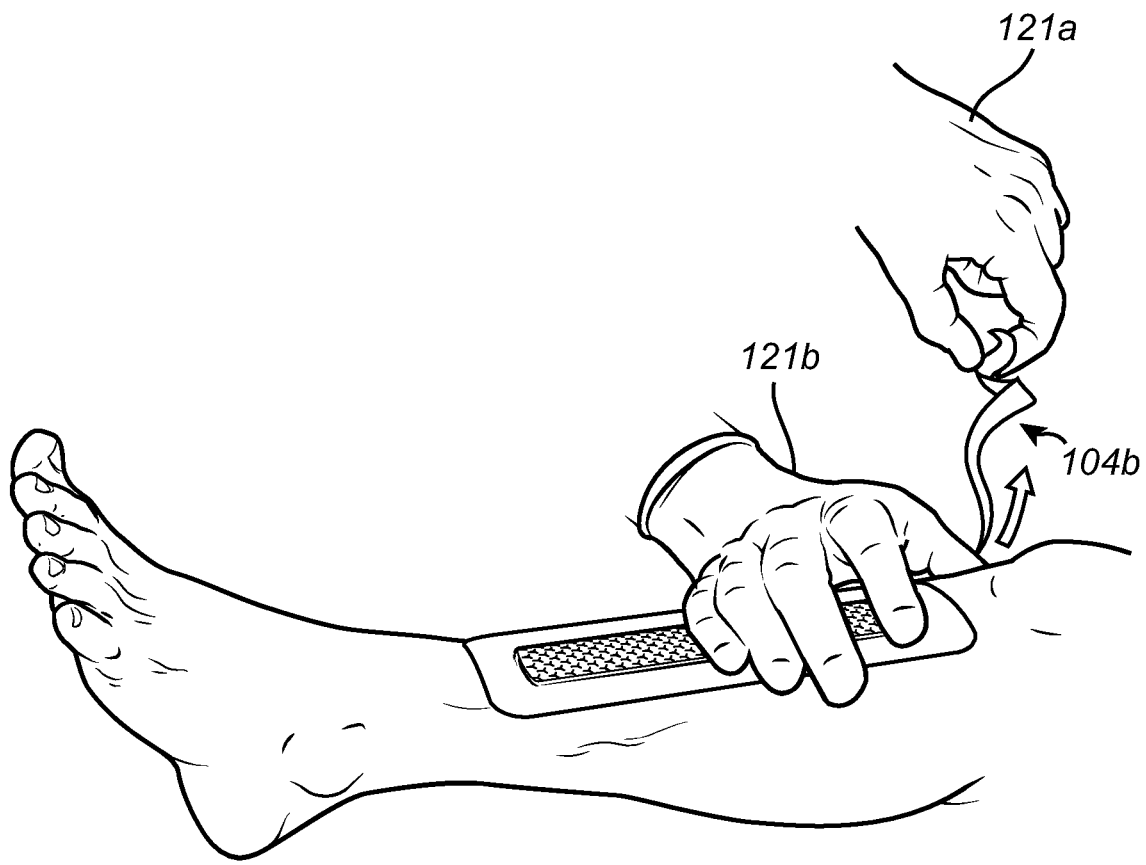

FIGS. 2g-2i illustrate the removal of the second removable portion 104b of the second release liner. The second tab piece 105b of the first tab 105 is grasped and the caregiver can carefully attach the edge portion of the adhesive skin contact layer of the dressing against the skin while simultaneously removing the second removable portion of the second release liner. One hand 121a is used to remove the second removable portion 104b in a stepwise manner and the other hand 121b can assist by gently pressing the dressing edges onto the skin (see FIGS. 2h-2i).

Figure 2J:
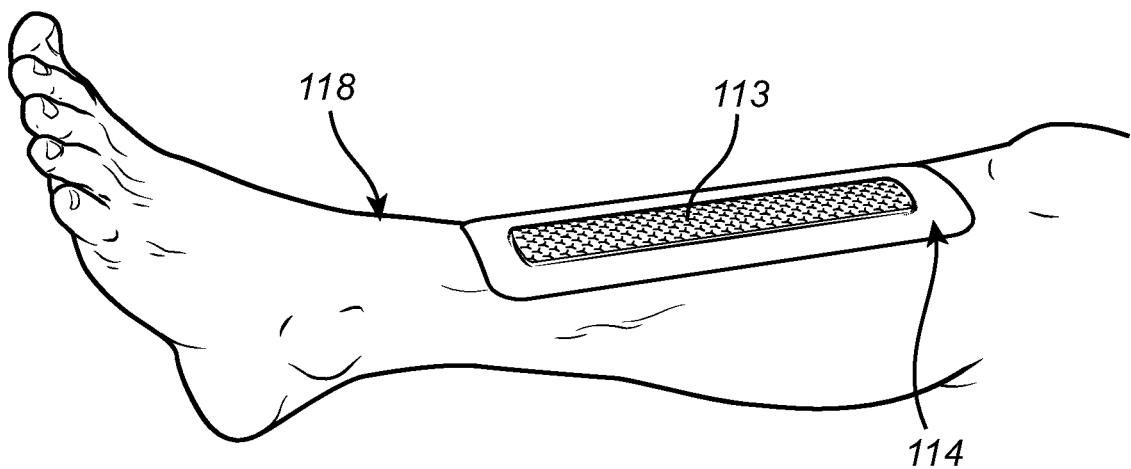

FIG. 2j illustrates the dressing 100 when attached to the leg of the wearer and where both release liners have been removed and discarded.

The procedure by which the release liners are removed from the adhesive skin contact layer allows for an improved control of dressings with thin border portions. The procedure prevents the edge portion of the dressing from folding, and the dressing can be precisely positioned on the skin in a sterile and wrinkle-free condition.

With reference to FIG. 3, a process for manufacturing a dressing comprising a first and a second release liner is illustrated. The process comprises:

providing a dressing 100 comprising a backing layer 101 and an adhesive skin contact layer 102, and optionally, an absorbent pad 113 arranged between the backing layer 101 and the adhesive skin contact layer 102, wherein the adhesive skin contact layer 102 comprises a central portion 102a and an edge portion 102b surrounding the central portion 102a, applying a second release liner 104 to at least a part of the edge portion 102b of the adhesive skin contact layer 102 applying a first release liner 103 to the central portion 102a of the adhesive skin contact layer 102, wherein the second release liner 104 is arranged between the edge portion 102b of the adhesive skin contact layer 102 and the first release liner 103.

The first release liner 103 is configured to cover the entire adhesive skin contact layer. In other words, the first release liner 103 is configured to cover the second release liner 104.

In FIG. 3, dressings comprising a backing layer, an adhesive skin contact layer and an absorbent pad arranged between the backing layer and the adhesive skin contact layer, are first provided. The procedure to provide such dressings are well known to those skilled in the art.

First, a plurality of dressings are fed onto a conveyor belt. The plurality of dressings are provided as a sheet 123 of un-cut dressings. Excess border material of the dressings is cut or "trimmed" by means of a first cutting tool 124.

Next, the second release liner is applied onto each dressing of the sheet 123 of dressings. A sheet of second release liner material 125 is first fed through a second cutting tool 126, wherein the sheet 125 is cut into the shape forming the second release liner. The sheet is cut such that the second release liner is formed into a frame. The part of the frame that forms the first and the second tabs are cut into two tab pieces. The second release liner thus comprises two removable frame portions. The waste 127 resulting from the cutting is removed from the process, and the resulting second release liner frames are applied to the plurality of dressings.

The first release liner is then applied. A sheet of first release liner material 129, which may be the same or different material as that forming the second release liner, is then applied. The peripheral edge of the sheet 129 is embossed by means of an embossing tool 130. The embossing tool 130 has a structured surface configured to impart a structured surface on the peripheral edge of the first release liner sheet 129. The plurality of dressings comprising the first release liner and the second release liner between the adhesive skin contact layer of the dressing and the first release liner, are fed into a pair of opposing cylindrical rolls 131 which serve to affix the first and the second release liners to the adhesive skin contact layer of the dressings. The process is not limited to a specific means to affix the first and the second release liner, but any means known to those skilled in the art may be utilized. The longitudinal edge of the first release liner sheet is embossed and is denoted 133 in FIG. 3.

The sheet of the plurality of dressings are thereafter cut into shape by means of a third cutting tool 132. A dressing 100 comprising the first and the second release liner is thus provided. The embossed gripping tab is denoted 111 in FIG. 3. The embossed gripping tab 1 overlies the first tab of the second release liner (not shown) and is co-extensive with the first tab. The second tab 107 of the second release liner extends beyond the periphery of the adhesive skin contact layer. The second tab 107 comprises a cut extending through the release liner tab such that two tab pieces are formed. The first tab of the second release liner comprises a similar cut (not illustrated in FIG. 3).

The process may further comprise providing a plurality of slits in the second release liner, wherein at least 80% of the slits are configured to extend in the same direction as the extension of the edge portion of the adhesive skin contact layer.

The slits may be provided by means of the first cutting tool 126. In other words, the slits are provided simultaneously with cutting the second release liner into shape.

The process of the present disclosure is not limited to the use of a specific means to cut the dressings into shape or to cut the release liners, but any technique may be used. The cutting and the fixing tools are in FIG. 3 illustrated as cylindrical rolls, but any means to cut or fixate the layers of the dressing may be used. For instance, cutting may be achieved by means of laser.

Terms, definitions and embodiments of all aspects of the present disclosure apply mutatis mutandis to the other aspects of the present disclosure.

Even though the present disclosure has been described with reference to specific exemplifying embodiments thereof, many different alterations, modifications and the like will become apparent for those skilled in the art.

Variations to the disclosed embodiments can be understood and effected by the skilled addressee in practicing the present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A dressing comprising:
a backing layer;
an adhesive skin contact layer having a skin-facing side; and
a first release liner having a top surface, wherein said adhesive skin contact layer comprises a central portion and an edge portion surrounding said central portion, wherein said first release liner is configured to be releasably attached to at least said central portion of said adhesive skin contact layer, characterized in that said dressing comprises a second release liner having a skin-facing surface and an outwardly facing surface opposite the skin-facing surface, wherein the second release liner is arranged between said first release liner and at least a part of said edge portion of said adhesive skin contact layer so that said skin-facing surface of the second release liner faces the first release liner and the outwardly facing surface of the second release liner faces the at least a part of said edge portion of said adhesive skin contact layer, wherein said top surface of said first release liner overlies and contacts said central portion of said adhesive skin contact layer, wherein said second release liner overlies and contacts said adhesive skin contact layer in said at least a part of said edge portion of said adhesive skin contact layer, wherein said second release liner spaces said first release liner from said adhesive skin contact layer in said at least a part of said edge portion of said adhesive skin contact layer, and wherein both the first and second release liners are positioned on the skin-facing side of the adhesive skin contact layer.

2. The dressing according to claim 1, wherein said second release liner comprises at least a first and a second removable portion.

3. The dressing according to claim 2, wherein said second release liner comprises a first tab configured to extend beyond the periphery of said adhesive skin contact layer and being arranged on a first edge of said edge portion of said adhesive skin contact layer, wherein said second release liner comprises a second tab configured to extend beyond the periphery of said adhesive skin contact layer and being arranged on a second edge, opposite of said first edge, of said edge portion of said adhesive skin contact layer, and wherein said first and said second removable portions of said second release liner are configured to extend between said first and said second tabs of said second release liner.

4. The dressing according to claim 3, wherein each of said first tab and said second tab is divided into two tab pieces and wherein each tab piece forms the distal end portion of said first and said second removable portions of said second release liner.

5. The dressing according to claim 4, wherein each of said first tab and said second tab is divided into two tab pieces by means of a dividing line wherein said dividing line is a cutting line or a score line.

6. The dressing according to claim 5, wherein said dressing has a lateral (x) extension and a longitudinal (y) extension and wherein said adhesive skin contact layer is contoured by a pair of lateral edges and a pair of longitudinal edges, wherein said first tab and said second tab are configured to extend beyond the periphery of said lateral and said longitudinal edges of said adhesive skin contact layer, and wherein said dividing line is configured to divide said first tab and said second tab into a respective first tab piece and a second tab piece, wherein the lateral extension of the first tab piece of said first tab is larger than the lateral extension of the second tab piece of said first tab, and wherein the lateral extension of the first tab piece of said second tab is smaller than the lateral extension of the second tab piece of said second tab.

7. The dressing according to claim 1, wherein said second release liner comprises a first tab configured to extend beyond the periphery of said adhesive skin contact layer and being arranged on a first edge of said edge portion of said adhesive skin contact layer.

8. The dressing according to claim 7, wherein said second release liner comprises a second tab configured to extend beyond the periphery of said adhesive skin contact layer and being arranged on a second edge, opposite of said first edge, of said edge portion of said adhesive skin contact layer.

9. The dressing according to claim 7, wherein said first release liner comprises at least one gripping tab configured to extend beyond the periphery of said adhesive skin contact layer and to overlap said first tab of said second release liner.

10. The dressing according to claim 9, wherein said second release liner comprises a second tab configured to extend beyond the periphery of said adhesive skin contact layer and being arranged on a second edge, opposite of said first edge, of said edge portion of said adhesive skin contact layer, wherein said at least one gripping tab and said first or said second tab have a different surface structure.

11. The dressing according to claim 10, wherein said at least one gripping tab, said first tab or said second tab is embossed.

12. The dressing according to claim 1, wherein said second release liner comprises a plurality of slits extending through said second release liner.

13. The dressing according to claim 12, wherein at least 80% of said slits are configured to extend in the same direction as the extension of the edge portion of said adhesive skin contact layer.

14. The dressing according to claim 1, wherein said dressing further comprises an absorbent pad arranged between said backing layer and said adhesive skin contact layer, wherein said backing layer and said adhesive skin contact layer are configured to extend beyond the periphery of said absorbent pad to define a border portion along the contour of said absorbent pad.

15. The dressing according to claim 14, wherein said edge portion of said adhesive skin contact layer constitutes from 10 to 60% of the surface area of said border portion.

16. The dressing according to claim 1, wherein said second release liner is arranged to follow the contour of at least 70% of said edge portion of said adhesive skin contact layer.

17. The dressing according to claim 1, wherein said edge portion constitutes from 0.3 to 30% of the surface area of said adhesive skin contact layer.

18. A process for manufacturing a dressing comprising a first and a second release liner; said process comprising:
providing a dressing comprising a backing layer and an adhesive skin contact layer, wherein said adhesive skin contact layer comprises a central portion and an edge portion surrounding said central portion, wherein the adhesive skin contact layer has a skin-facing side,
applying a second release liner to at least a part of the edge portion of said adhesive skin contact layer, wherein the second release liner has a skin-facing surface and an outwardly facing surface opposite the skin-facing surface, and
applying a first release liner to said central portion of said adhesive skin contact layer of said dressing, said first release liner having a top surface, wherein said second release liner is arranged between said edge portion of said adhesive skin contact layer and said first release liner so that said skin-facing surface of the second release liner faces the first release liner and the outwardly facing surface of the second release liner faces at least a part of said edge portion of said adhesive skin contact layer, wherein said top surface of said first release liner overlies and contacts said central portion of said adhesive skin contact layer, wherein said second release liner overlies and contacts said adhesive skin contact layer in said at least a part of said edge portion of said adhesive skin contact layer, wherein said second release liner spaces said first release liner from said adhesive skin contact layer in said at least a part of said edge portion of said adhesive skin contact layer, and wherein both the first and second release liners are positioned on the skin-facing side of the adhesive skin contact layer.

19. The process according to claim 18, wherein said process further comprises
providing a plurality of slits in said second release liner, wherein at least 80% of said slits are configured to extend in the same direction as the extension of the edge portion of said adhesive skin contact layer.

* * * * *